US009894700B2

(12) United States Patent
Kemmerer, Jr. et al.

(10) Patent No.: US 9,894,700 B2
(45) Date of Patent: *Feb. 13, 2018

(54) DIRECT ROUTING OF COMMUNICATION SESSIONS FOR MOBILE IP COMMUNICATION END POINTS

(71) Applicant: GENBAND US LLC, Frisco, TX (US)

(72) Inventors: Frederick C. Kemmerer, Jr., Hollis, NH (US); Carroll L. Gray-Preston, Morrisville, NC (US); Jeremy Fuller, Linlithgow (GB)

(73) Assignee: GENBAND US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/339,824

(22) Filed: Oct. 31, 2016

(65) Prior Publication Data
US 2017/0048909 A1 Feb. 16, 2017

Related U.S. Application Data

(63) Continuation of application No. 13/840,072, filed on Mar. 15, 2013, now Pat. No. 9,485,707.

(51) Int. Cl.
H04W 4/00 (2009.01)
H04W 76/02 (2009.01)
(Continued)

(52) U.S. Cl.
CPC .......... H04W 76/023 (2013.01); H04L 45/04 (2013.01); H04L 67/104 (2013.01); H04W 8/12 (2013.01);
(Continued)

(58) Field of Classification Search
None
See application file for complete search history.

(56) References Cited

U.S. PATENT DOCUMENTS 6,490,259 B1 12/2002 Agrawal et al.
2008/0176532 A1 7/2008 Kankar et al.
(Continued)

FOREIGN PATENT DOCUMENTS

EP 2337386 A1 6/2011
WO 99/17506 A2 4/1999

OTHER PUBLICATIONS

European Patent Office, "Extended European search report," issued in EP Application No. 14159647.8, dated Oct. 17, 2014, 6 Pages.
(Continued)

Primary Examiner — Kibrom T Hailu
(74) Attorney, Agent, or Firm — Fogarty LLP

(57) ABSTRACT

Embodiments of methods and systems for direct routing of communication sessions for mobile IP communication end points are presented. The methods may be implemented in a service provider network. In one embodiment, a method includes receiving, on a first service provider network, a request for access to a target communication device, the target communication device being associated with a second service provider network. The method may also include receiving an indicator, from the second service provider network, that the target communication device is roaming on a third service provider network. Additionally, the method may include establishing a peer-to-peer communication link with the target communication device on the third service provider network by a direct peer-to-peer interconnection process.

21 Claims, 9 Drawing Sheets

(51) Int. Cl.
*H04W 40/20* (2009.01)
*H04W 80/04* (2009.01)
*H04L 12/715* (2013.01)
*H04W 8/12* (2009.01)
*H04W 40/02* (2009.01)
*H04L 29/08* (2006.01)
*H04L 29/12* (2006.01)
*H04W 8/08* (2009.01)

(52) U.S. Cl.
CPC ........... *H04W 40/02* (2013.01); *H04W 40/20* (2013.01); *H04W 80/04* (2013.01); *H04L 61/157* (2013.01); *H04L 61/1511* (2013.01); *H04W 8/085* (2013.01)

(56) References Cited

U.S. PATENT DOCUMENTS

2012/0096136 A1 4/2012 Park et al.
2012/0311686 A1 12/2012 Medina et al.

OTHER PUBLICATIONS

Roos, Anders, et al.: "Critical issues for roaming in 3G", IEEE Wireless Communications, Feb. 1, 2003, pp. 29-35, vol. 10, No. 1, IEEE Service Center, Piscataway, NJ, US.

DIRECT ROUTING OF COMMUNICATION SESSIONS FOR MOBILE IP COMMUNICATION END POINTS

CROSS-REFERENCE TO RELATED APPLICATIONS

This is a continuation of U.S. patent application Ser. No. 13/840,072, also entitled Direct Routing of Communication Sessions for Mobile IP Communication End Points, filed Mar. 15, 2013 and issued as U.S. Pat. No. 9,485,707, on Nov. 1, 2016, which is incorporated herein by reference in its entirety. This application is also related to U.S. patent application Ser. No. 13/838,769, entitled "Peer-to-Peer Interconnection Between Service Providers," filed on Mar. 15, 2013 and issued as U.S. Pat. No. 9,270,516 on Feb. 23, 2016; Ser. No. 13/841,185, entitled "Determining Peer-to-Peer Communication Paths between Service Providers," filed on Mar. 15, 2013 and issued as U.S. Pat. No. 9,042,235 on May 26, 2015; and Ser. No. 15/049,241 also entitled "Peer-to-Peer Interconnection Between Service Providers," filed on Feb. 22, 2016; each of which are incorporated herein by reference in their entirety.

TECHNICAL FIELD

This disclosure relates generally to telecommunications, and more specifically, to methods and systems for direct routing of communication sessions for mobile IP communication end points.

BACKGROUND

The following discussion sets forth the inventors' own knowledge of certain technologies and/or problems associated therewith. Accordingly, this discussion is not an admission of prior art, and it is not an admission of the knowledge available to a person of ordinary skill in the art.

The telecommunications market includes many different service providers, each typically offering compatible communications services. Compatibility is often required so that customers of one service provider can communicate with friends, family, or other end users who may be customers of another service provider. Although service providers typically offer services that are compatible with other service provider networks, there has not conventionally been a direct connect option between users of diverse service provider networks.

One prior solution for handling interfaces between different service provider networks is conventionally handled by a third party intermediary. The third party intermediary would typically establish an interconnect agreement with many different service providers, and then provide connection services between users of the different service provider networks.

In certain situations, a communication will hop between multiple third parties or across multiple carriers in order to find an agreed path between communication endpoints. In legacy systems, a call may be routed through several carriers before connecting between the end users. Each connection may include connection and/or termination fees. These prior systems become very complex and expensive.

With existing IP interconnection implementations in mobile roaming scenarios, control signaling and media is routed through the home networks so that services can be applied and the home network can make the decision on whether or not the media should be optimally routed.

SUMMARY

Embodiments of methods and systems for direct routing of communication sessions for mobile IP communication end points are presented. The methods may be implemented in a service provider network. In one embodiment, a method includes receiving, on a first service provider network, a request for access to a target communication device, the target communication device being associated with a second service provider network. The method may also include receiving an indicator, from the second service provider network, that the target communication device is roaming on a third service provider network. Additionally, the method may include establishing a peer-to-peer communication link with the target communication device on the third service provider network by a direct peer-to-peer interconnection process.

BRIEF DESCRIPTION OF THE DRAWINGS

Reference will now be made to the accompanying drawings, wherein.

DETAILED DESCRIPTION

Embodiments disclosed herein are directed generally to methods and systems for direct routing of communication sessions for mobile IP communication end points. According to certain embodiments, the home network of the roaming endpoint can make the decision to directly route the control signaling only or both control signaling and media directly to the visited network thereby creating a more optimal route. Accordingly, certain embodiments provide methods and systems for direct routing for interconnecting IP communication traffic among carriers where endpoints are roaming outside of the home network.

Beneficially, such an embodiment may create a more efficient and cost effective means of IP mobile traffic routing, especially in roaming scenarios. Additionally, certain embodiments may achieve major improvements in efficiency of interconnecting and handling mobile signaling and media traffic among carriers, especially in roaming scenarios. The Peer-to-Peer Interconnect system enables an optimal direct routing decision to be made in a peer-to-peer configuration amongst service providers involved in a roaming scenario as well as to determine how to reach the proper point in the visited network service provider's network. The roaming system described herein also generates records for billing as part of the peer-to-peer roaming session sequence.

This invention eliminates the requirement to route mobile traffic (signalling and/or media) through the home carrier's network in roaming scenarios inherent in existing approaches.

The term "telecommunications," as used herein, is intended to encompass voice communications or telephony, as well as other forms of communications (e.g., video communications, videoconferencing, instant messaging or IM, Short Messaging Service or SMS, emails, etc.) that may take place electronically, for example, over wireless networks, circuit-switched networks, packet-switched networks, or any combination thereof.

Figure 1:
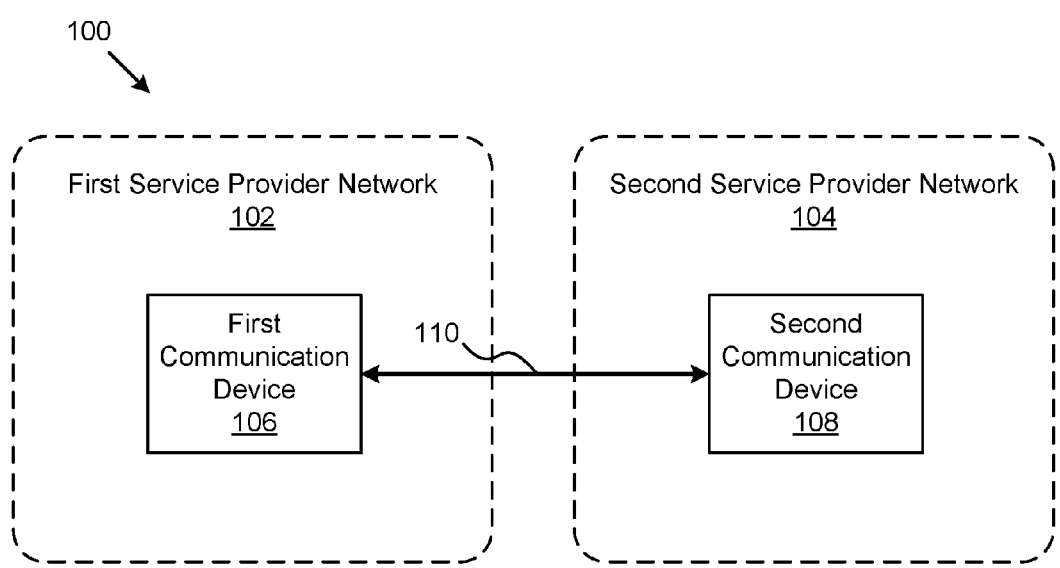
FIG. 1 is a block diagram illustrating one embodiment of a system for direct routing of communication sessions for mobile IP communication end points.

FIG. 1 is a block diagram illustrating one embodiment of a system for peer-to-peer interconnection between service providers. In one embodiment, the system 100 includes a first service provider network 102 and a second service provider network 104. Examples of service providers include, but are not limited to, AT&T®, Verizon®, Vodafone™, etc. In one embodiment, the provider networks 102 may be the networks may be packet-switched, circuit-switched, wireless, or any combination thereof. In general embodiments, a first communication device 106 on the first service provider network 102 may be configured to communicate with a second communication device 108 on a second service provider network 104 over a peer-to-peer communication interconnection path 110 between the first service provider network 102 and the second service provider network 104. In one embodiment, first communication device 106 and second communication device 108 are user communication devices (e.g., telephones, mobile phones, laptops, tablet computers, etc.) for a user who is a subscriber of the first service provider network 102 and second service provider network 104 respectively. As used herein, the term "foreign service provider" means a different service provider network than one that a user subscribes to (e.g., second service provider network 104 as to first communication device 106 in FIGS. 1-2).

Beneficially, such an embodiment may enable the first communication device 106 to initiate, negotiate, and carry out communications with the second communication device 108 without requiring a central route lookup function or an administrator. More specifically, the present embodiments may eliminate use of centralized or third-party interconnection sources, and the associated expenses of routing and relating number lookup information. Thus, use of such centralized or third-party interconnection sources by the service providers 102,104 is not required for enabling communication between devices 106,108. Further benefits may include elimination of class 4 interconnection elements in existing network infrastructures.

Figure 2:
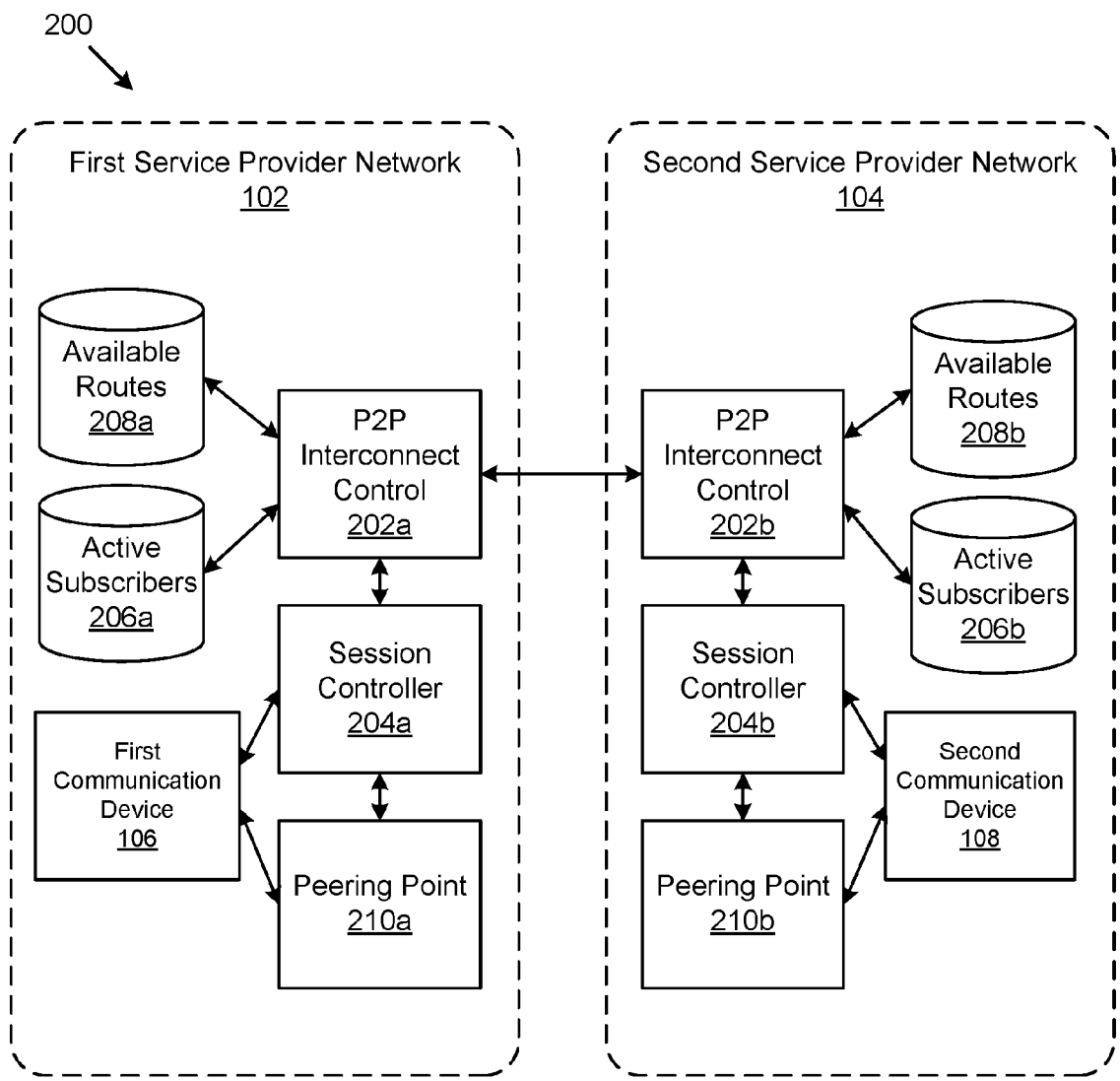
FIG. 2 is a block diagram illustrating another embodiment of a system for direct routing of communication sessions for mobile IP communication end points.

FIG. 2 is a block diagram illustrating another embodiment of a system 200 for peer-to-peer interconnection between service providers. As in FIG. 1, system 200 may also include a first service provider network 102 and a second service provider network 104, each providing user connectivity to a first communication device 106 and second communication device 108 respectively. In addition, the system 200 may include a peer-to-peer interconnect control 202a-b, and a session controller 204a-b.

Peer-to-peer interconnect control 202 may be configured to access and query active subscribers database 206 and available routes database 208. In one embodiment, each of the first service provider network 102 and the second service provider network 104 each maintain an active subscribers database 206a,b and an available routes database 208a,b respectively for storing connectivity information for the local network. For example, an identifier associated with first communication device 106 may be stored in active subscribers database 206a, which is maintained by first service provider network 102. Similarly, available routes database 208a may store a listing of available connection routes for accessing first communication device 106. Likewise, the active subscribers database 206b and available routes database 208b maintained by second service provider network 104 may include information for connecting to second communication device 108.

Peer-to-Peer interconnect control 202a may handle coordination of peer-to-peer communication routing for all devices on first service provider network 102. In one embodiment, peer-to-peer interconnect control 202a may be a communication interface to second service provider network 104 and other service provider networks. Session controller 204a may be in communication with peer-to-peer control 202a, and may serve as an internal interface to first communication device 106. Peering point 210a may handle device-to-device communication between the first communication device 106 and the second communication device 108 once the peer-to-peer link has been negotiated and routed by peer-to-peer interconnect control 202a.

Thus, in a simplified view, the peer-to-peer interconnect control 202a negotiates and routes peer-to-peer communication links between service provider networks, session controller 204a handles intra-network interfaces between devices, and peering point 210a handles content communication between service provider networks once the link has been established by peer-to-peer interconnect control 202a. One of ordinary skill in the art will recognize that each of the corresponding devices in the second service provider network have a similar and corresponding function.

Figure 3:
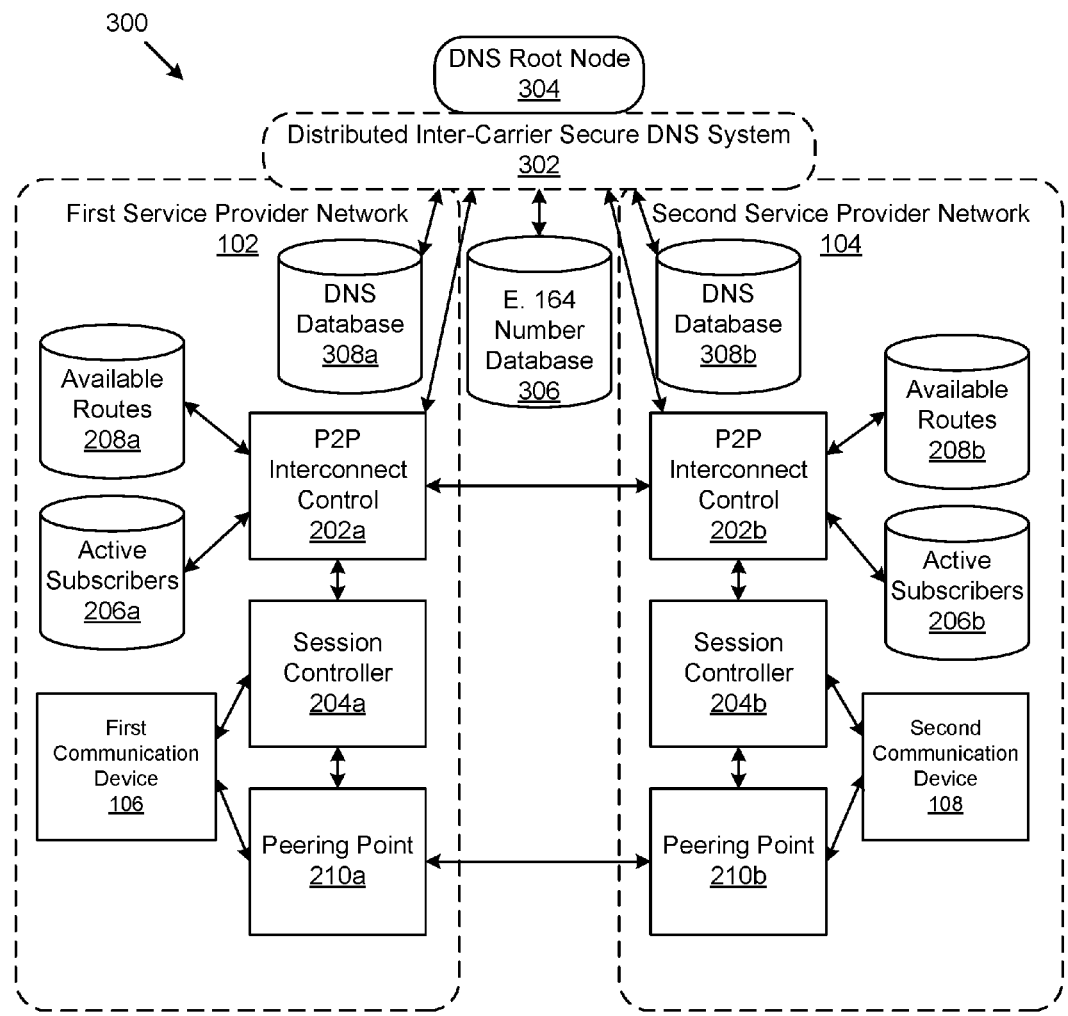
FIG. 3 is a block diagram illustrating another embodiment of a system for direct routing of communication sessions for mobile IP communication end points.

FIG. 3 is a block diagram illustrating another embodiment of a system 300 for peer-to-peer interconnection between service providers 102-104. The embodiment of FIG. 3 illustrates additional components which may facilitate peer-to-peer interconnection between service provider networks. In addition to the components described in FIGS. 1-2, the embodiment of FIG. 3 includes a Distributed Inter-Carrier Secure DNS System (DICSDS) 302, a DNS root node 304, and an E.164 Number (ENUM) database 306. In addition, each service provider network may include a DNS database 308a,b respectively.

In one embodiment, DICSDS 302 may be a common DNS system among service providers and E.164 providers. In one embodiment, DNS name resolution data may be controlled by the owning service provider via their local segment of the DICSDS 302. In one embodiment, DICSDS 302 may facilitate address lookup for interface nodes within service provider networks. For example, peer-to-peer interconnect control 202a on the first service provider network 102 may query DICSDS 302 to determine an address for P2P interconnect control 202b on the second service provider network 104 in order to initiate P2P route negotiations.

ENUM database 306 may contain a commonly accessible list of ENUM identifiers, which DICSDS 302 may access in response to a query from a P2P interconnect control 202. ENUM database 306 enables E.164 number to Service Provider mapping via DNS. DNS root node 304 enables the first service provider 102 and the second service provider 104 to create a common DNS system, such that both service providers have access to common address data.

Figure 4:
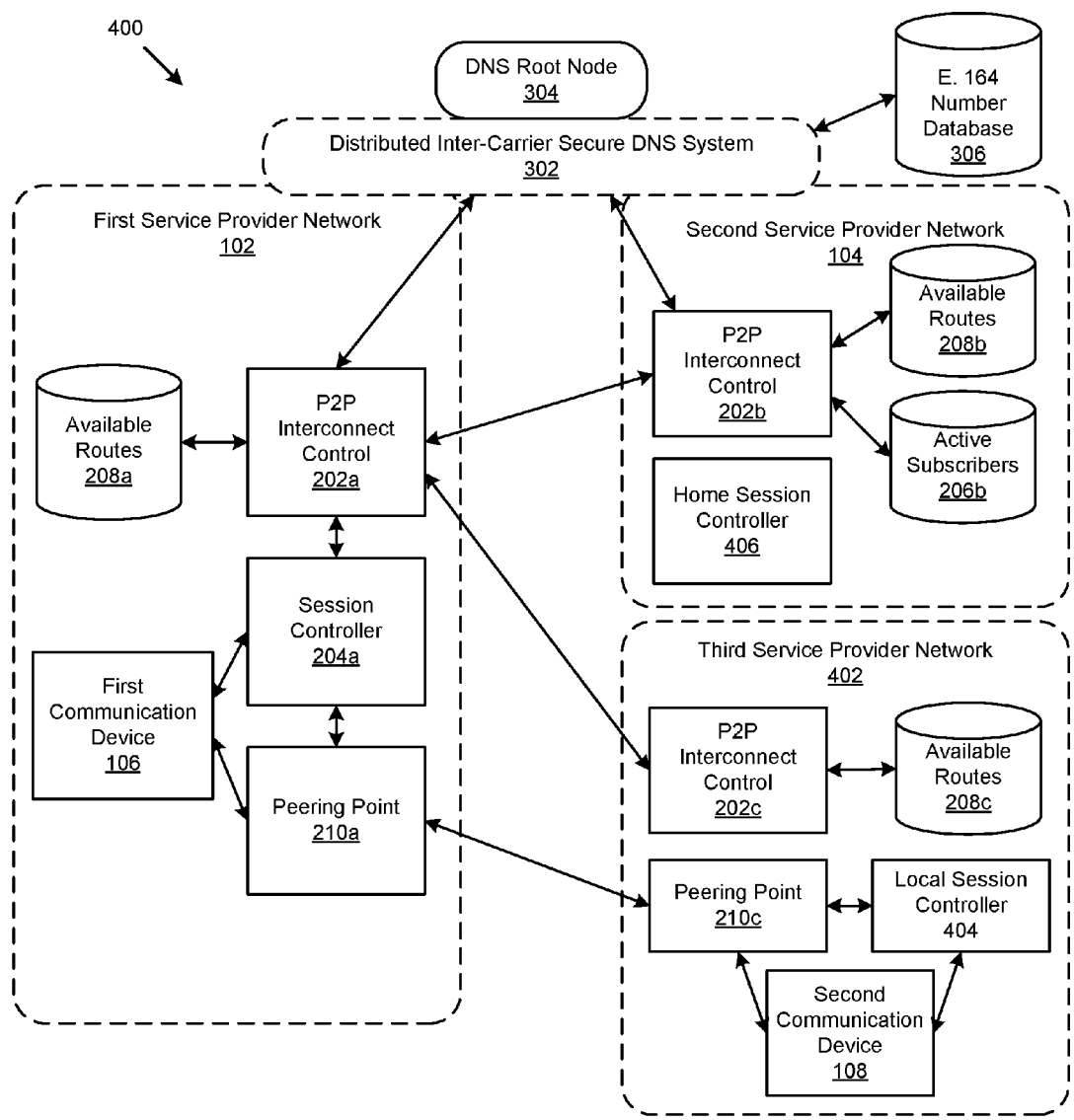
FIG. 4 is a block diagram illustrating another embodiment of a system for direct routing of communication sessions for mobile IP communication end points.

FIG. 4 illustrates a further embodiment of a system 400 for direct routing of communication sessions for mobile IP communication end points. System 400 may include the components of first service provider network 102 and second service provider network 104 substantially as described above with reference to FIG. 3. In addition, FIG. 4 may include a third service provider network 402.

Third service provider network 402 may also include P2P interconnect control 202c, available routes database 208c, peering point 210c and a local session controller (or session proxy) 404. In one embodiment, second communication device 108 may be configured to roam on third service provider network 402 and communicate with peering point 210c as well as local session controller 404.

Figure 5:
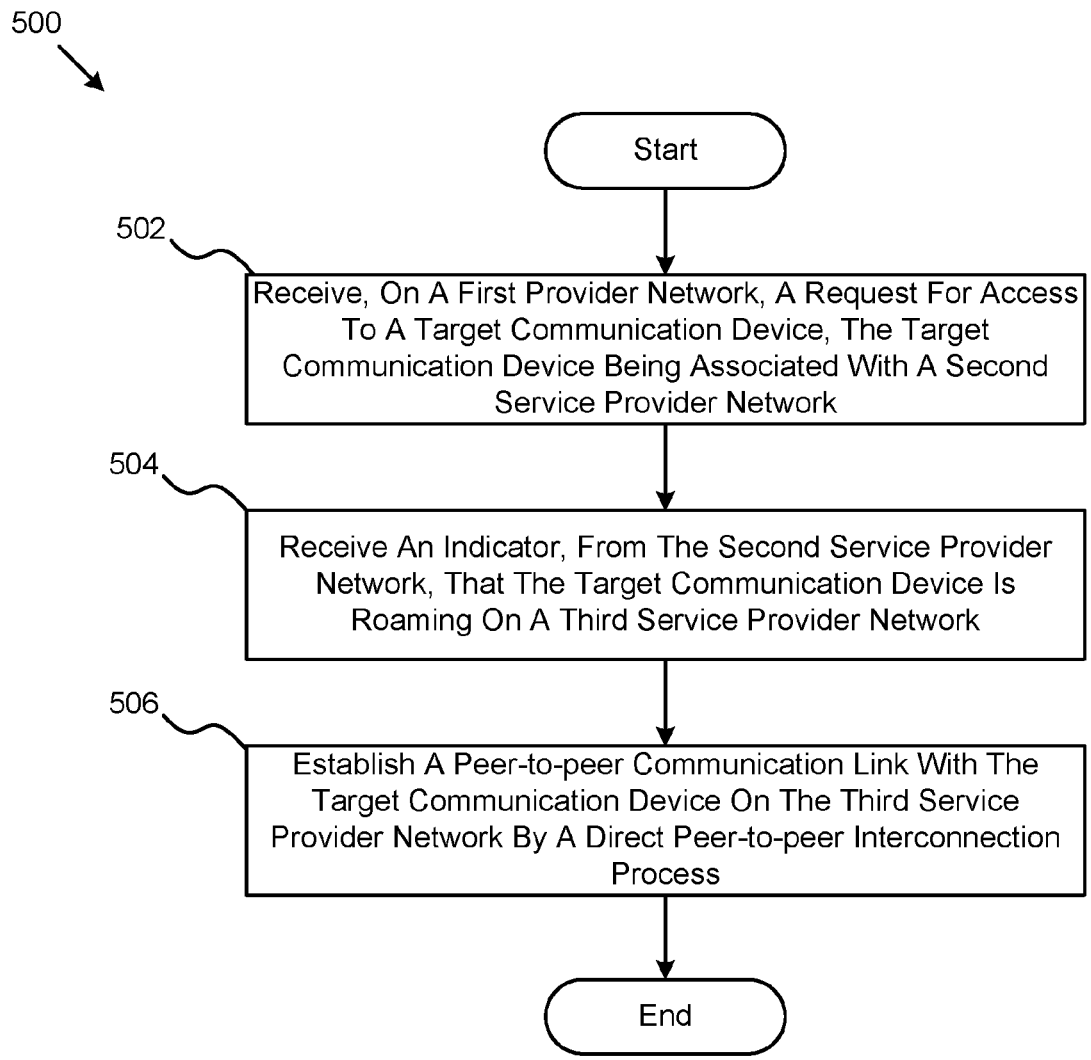
FIG. 5 is a flowchart of a method for direct routing of communication sessions for mobile IP communication end points.

FIG. 5 illustrates one embodiment of a method 500 for direct routing of communication sessions for mobile IP communication end points. The method 500 may start when session controller 204a receives a request, as shown at block 502, from first communication device 106 to access second communication device 108 which has roamed from its home network (second service provider network 104) to a third service provider network 402. Following embodiments described herein, as well as embodiments described in the co-pending related applications set forth above, the P2P interconnect control 202a may receive an indicator, from the second service provider network 104, that the second communication device 108 is roaming on the third service provider network 402 as shown in block 504. In response, the P2P interconnect control 202a may establish a peer-to-peer communication link with the second 108 communication device on the third service provider network 402 by a direct peer-to-peer interconnection process as shown at block 506. In one embodiment, the direct peer-to-peer interconnection process may be established directly between the first service provider network 102 and the third service provider network 402. Alternatively, a direct peer-to-peer interconnection process may be established directly between the first service provider network 102 and the second service provider network 104, and a second direct peer-to-peer interconnection process may be established directly between the second service provider network 104 and the third service provider network 402, thus establishing a link between first communication device 106 and second communication device 108. In still further embodiments, hyprid connections may be established as described in greater detail below.

Figure 6:
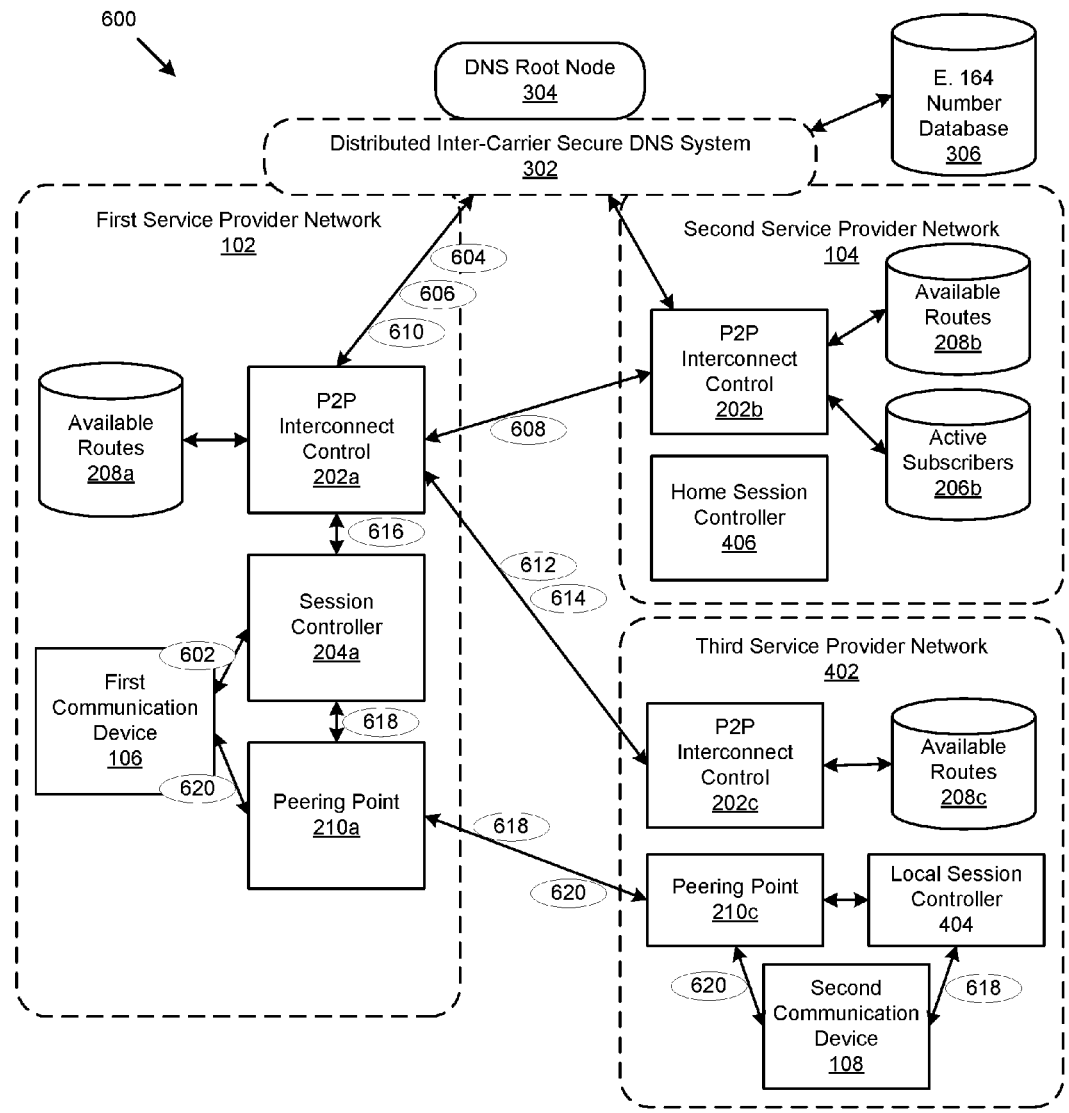
FIG. 6 is system state diagram illustrating one embodiment of a method for direct routing of communication sessions for mobile IP communication end points.

FIG. 6 illustrates one embodiment of a method 600 for direct routing of communication sessions for mobile IP communication end points. In one embodiment the method 600 starts when first communication device 106 initiates, at state 602, a session to second communication device 108. In the depicted embodiment, first communication device 106 is a subscriber on first service provider network 102 and second communication device is a subscriber of the second service provider network 104, but roaming on third service provider network 402 at the time of the request. More specifically, first communication device 106 may send a request to session controller 204a as shown by state 602.

At state 604, P2P interconnect control 202a may perform an ENUM query to look up the identity of the home network of second communication device 108 (e.g., second service provider 104). Additionally, as shown at state 606, the P2P interconnect control 202a may query the DNS route server 302 to obtain the Name Server address where the address of P2P interconnect control 202b for second service provider network 104 can be obtained, and obtain the node address for P2P interconnect control 202b.

At state 608, P2P interconnect control 202a of the first service provider network 102 may contact P2P interconnect control 202b of the second service provider network 104 to confirm that P2P interconnect services are supported by second service provider network 104. In the embodiment described, however, P2P interconnect control 202a may obtain redirect information due to roaming through query of Active Subscriber Database 208b.

At state 610, P2P interconnect control 202a may then query DNS server 302 to obtain the address for the third service provider network 402 and then contact P2P interconnect controller 202c on third service provider network 402 as shown at state 612.

At state 614, P2P interconnect control 202c to may query available routes database 208c to identify available routes to second communication device 108 and return the available routes to P2P interconnect control 202a on the first service provider network 102. At state 616, P2P interconnect control 202a may use the available route information to select a route to peering point 210c, which may render a Session Detail Record (SDR) for accounting use at the end of the session. At state 618, session controller 204a may establish signaling between peering point 210a and remote peering point 210c using the selected route. At state 620, a media path may be established between peering point 210a and peering point 210c, which enables the first communication device 106 to communicate content with second communication device 108 while roaming on third service provider network 402.

Figure 7:
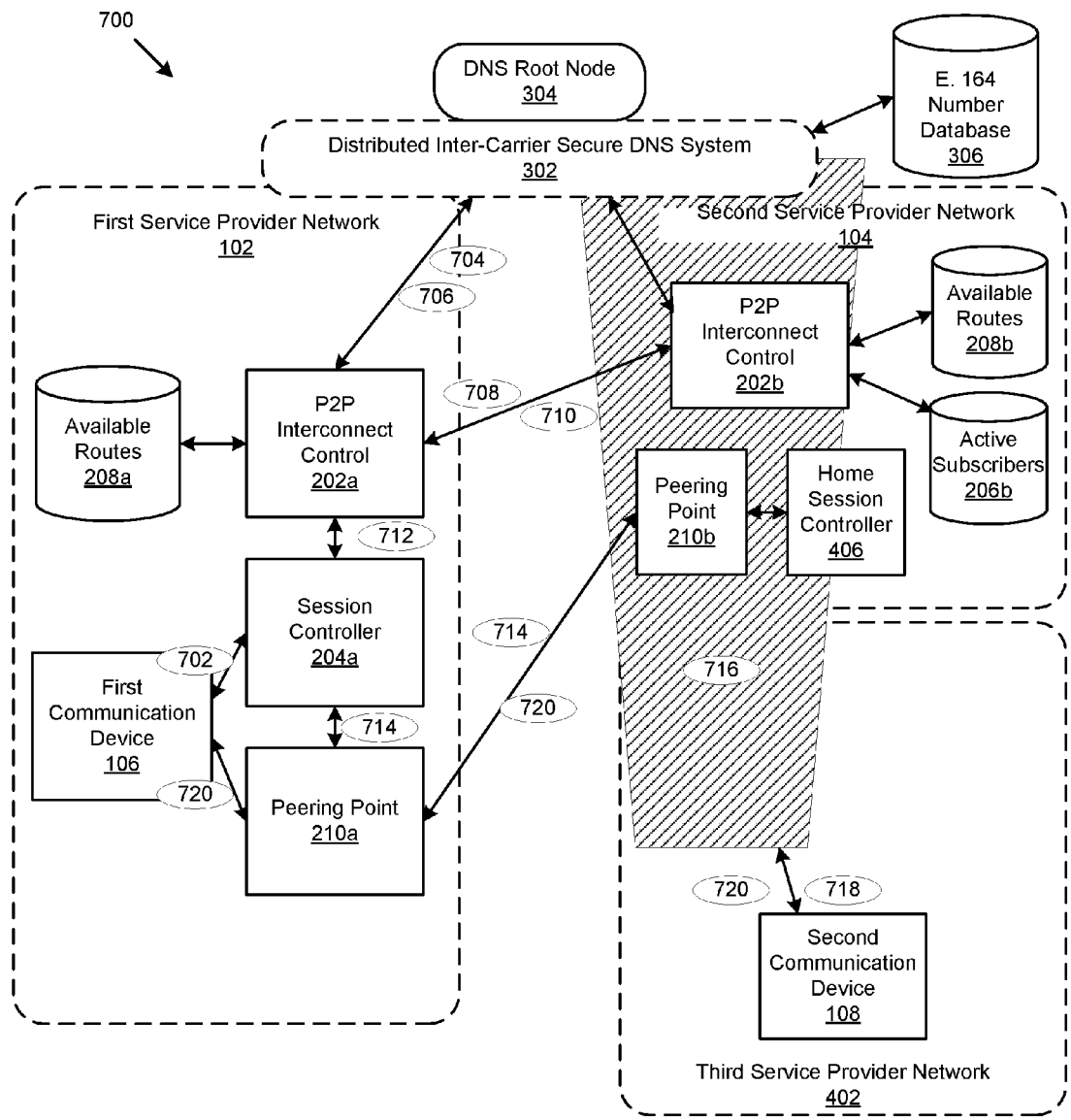
FIG. 7 is system state diagram illustrating one embodiment of a method for direct routing of communication sessions for mobile IP communication end points.

FIG. 7 illustrates an embodiment of a method 700 for direct routing of communication sessions for mobile IP communication end points, where the target communication device's home network (e.g., second service provider network 104) handles signaling interface and media interface with first service provider network 102.

In one embodiment the method 700 starts when first communication device 106 initiates, at state 702, a session to second communication device 108. In the depicted embodiment, first communication device 106 is a subscriber on first service provider network 102 and second communication device is a subscriber of the second service provider network 104, but roaming on third service provider network 402 at the time of the request. More specifically, first communication device 106 may send a request to session controller 204a as shown by state 702.

At state 704, P2P interconnect control 202a may perform an ENUM query to look up the identity of the home network of second communication device 108 (e.g., second service provider 104). Additionally, as shown at state 706, the P2P interconnect control 202a may query the DNS route server 302 to obtain the Name Server address where the address of P2P interconnect control 202b for second service provider network 104 can be obtained, and obtain the node address for P2P interconnect control 202b.

At state 708, P2P interconnect control 202a of the first service provider network 102 may contact P2P interconnect control 202b of the second service provider network 104 to confirm that P2P interconnect services are supported by second service provider network 104. At state 710, P2P interconnect control 202b may return routing information for establishing a link between peering point 210a and peering point 210b as shown at states 712 and 714, which operate normally.

At state 716, second service provider network 104 establishes a second peer-to-peer link with third service provider network 402 and signaling links as well as media links are established. The signaling and media are forwarded by second service provider network 104 to first service provider 102 as shown at state 718 and 720. In such an embodiment, the second service provider may maintain control of communications with second communication device 108 in a way that may be transparent to first communication device 106.

Figure 8:
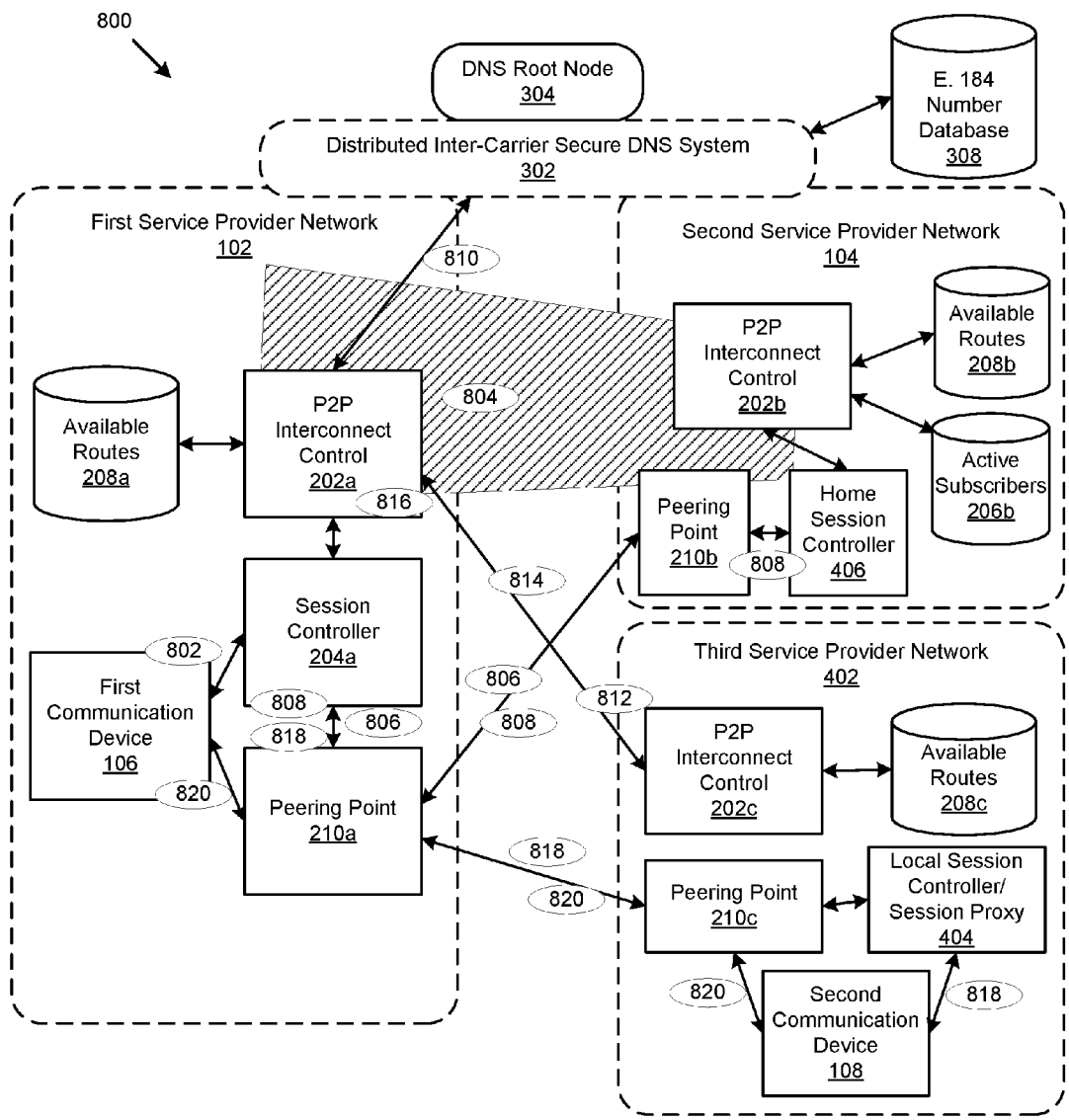
FIG. 8 is system state diagram illustrating one embodiment of a method for direct routing of communication sessions for mobile IP communication end points.

FIG. 8 illustrates an embodiment of a method 800 for direct routing of communication sessions for mobile IP communication end points, where the target communication device's home network (e.g., second service provider network 104) handles signaling interface but a direct media interface between first service provider network 102 and third service provider network 402 is established.

In the depicted embodiment, first communication device 106 is a subscriber on first service provider network 102 and second communication device is a subscriber of the second service provider network 104, but roaming on third service provider network 402 at the time of the request. More specifically, first communication device 106 may send a request to session controller 204a as shown by state 802.

At state 804, a signaling interface between first service provider network 102 and second service provider network 104 may be established according to the various methods previously described. Once the signaling interface is established, the peering point 210a and peering point 210b may be in communication at state 806. Due to the subscriber roaming the home session control 406 loops the control signalling back to the first service provider network 102 with the destination address of the Local Session Proxy in third service provider network 402 as shown at state 808. At step 810, P2P interconnect control 202a may query the DNS server 302 to identify the name server address where the P2P interconnect control node 202c of the third service provider network 402 may be found. P2P interconnect control 202a may then contact P2P interconnect control 202c and query available routes to second communication device 108 as shown at state 812. P2P interconnect control 202c may return routes including peering point 210c as shown at state 814. Session controller 204a may then determine the path to peering point 210c as shown at state 816. Communications may then be established between first communication device 106 and second communication device 108 at states 818 and 820.

Figure 9:
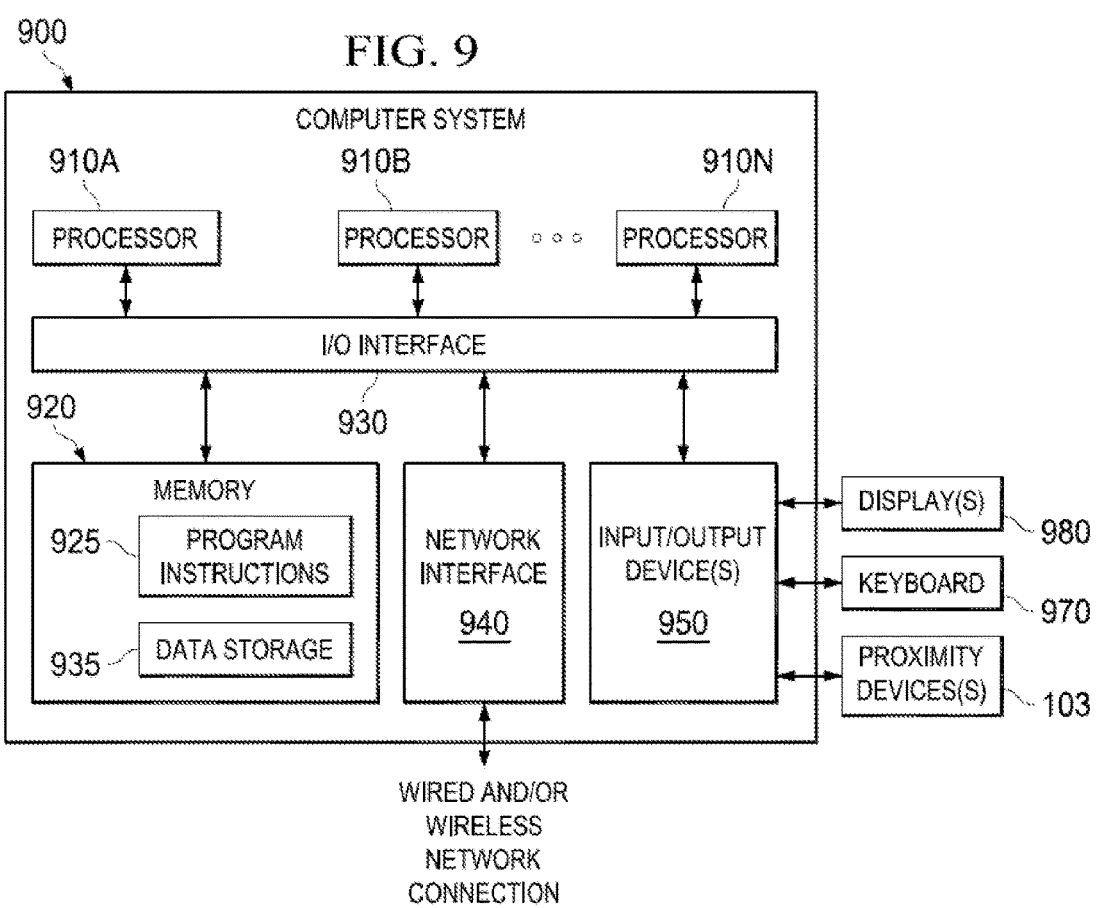
FIG. 9 is a block diagram of a computer system configured to implement various systems and methods described herein according to some embodiments.

As noted above, embodiments of methods and systems for direct routing of communication sessions for mobile IP communication end points may be implemented or executed, at least in part, by one or more computer systems. One such system is illustrated in FIG. 9. In various embodiments, system 900 may be a server, a workstation, a desktop computer, a laptop, a tablet computer, a mobile device, a smart phone, or the like. In some cases, system 900 may be used to implement communication devices 101 and/or 102, and application server(s) 105 shown in FIG. 1. As illustrated, computer system 900 includes one or more processor(s) 910A-N coupled to a system memory 920 via an input/output (I/O) interface 930. Computer system 900 further includes a network interface 940 coupled to I/O interface 930, and one or more input/output devices 950, such as proximity device(s) 103 (e.g., a Bluetooth® adaptor, a Wifi adaptor, or the like), keyboard 970, and display(s) 980.

In various embodiments, computer system 900 may be a single-processor system including one processor 910A (e.g., processor 201 shown in FIG. 2), or a multi-processor system including two or more processors 910A-N (e.g., two, four, eight, or another suitable number). Processor(s) 910A-N may include any processor capable of executing program instructions. For example, in various embodiments, processor(s) 910A-N may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processor(s) 910A-N may commonly, but not necessarily, implement the same ISA. Also, in some embodiments, at least one processor 910A may be a graphics processing unit (GPU) or other dedicated graphics-rendering device.

System memory 920 may be configured to store program instructions (e.g., algorithms for querying databases, accessing foreign service provider networks, etc.) and/or data accessible by processor(s) 910A-N. In various embodiments, system memory 920 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described in connection with FIGS. 4-8, may be stored within system memory 920 as program instructions 925 and data storage 935, respectively. Additionally or alternatively, methods described herein may be implemented asa software program that is stored within system memory 920 and is executable by processor(s) 910A-N. In other embodiments, program instructions and/or data may be received, sent or stored upon different types of computer-accessible media or on similar media separate from system memory 920 or computer system 900. Generally speaking, a computer-accessible medium may include any tangible or non-transitory storage media or memory media such as electronic, magnetic, or optical media—e.g., disk or CD/DVD-ROM coupled to computer system 900 via I/O interface 930. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 930 may be configured to coordinate I/O traffic between processor(s) 910A-N, system memory 920, and any peripheral devices in the device, including network interface 940 or other peripheral interfaces, such as input/output devices 950. In some embodiments, I/O interface 930 may perform any necessary protocol, timing or other data transformations to convert data signals from one component (e.g., system memory 920) into a format suitable for use by another component (e.g., processor(s) 910A-N). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. In addition, in some embodiments some or all of the functionality of I/O interface 930, such as an interface to system memory 920, may be incorporated directly into processor(s) 910A-N.

Network interface 940 may be configured to allow data to be exchanged between computer system 900 and other devices attached to a network (e.g., telecommunications network 104 of FIG. 1), such as other computer systems, or between nodes of computer system 900. In various embodiments, network interface 940 may support communication via wired or wireless general data networks, such as any suitable type of Ethernet network, for example; via telecommunications/telephony networks such as analog voice networks or digital fiber communications networks; via storage area networks such as FibreChannel SANs, or via any other suitable type of network and/or protocol.

Input/output devices 950 may, in some embodiments, include one or more display terminals, keyboards, keypads, touchpads, scanning devices, RFID readers, NFC readers, voice or optical recognition devices, or any other devices suitable for entering or retrieving data by one or more computer system 900. Multiple input/output devices 950 may be present in computer system 900 or may be distributed on various nodes of computer system 900. In some embodiments, similar input/output devices may be separate from computer system 900 and may interact with one or more nodes of computer system 900 through a wired or wireless connection, such as over network interface 940.

As shown in FIG. 9, memory 920 may include program instructions 925, configured to implement certain embodiments described herein, and data storage 935, comprising various data may be accessible by program instructions 925. In an embodiment, program instructions 925 may include software elements of embodiments illustrated in the above figures. For example, program instructions 925 may be implemented in various embodiments using any desired programming language, scripting language, or combination of programming languages and/or scripting languages (e.g., C, C++, C#, Java™, JavaScript™, Perl, etc.). Data storage 935 may include data that may be used in these embodiments (e.g., recorded communications, profiles for different modes of operations, etc.). In other embodiments, other or different software elements and data may be included.

A person of ordinary skill in the art will appreciate that computer system 900 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system or processor-based configurations.

Although certain embodiments are described herein with reference to specific examples, numerous modifications and changes may be made in light of the foregoing description. Accordingly, the specification and figures are to be regarded in an illustrative rather than a restrictive sense, and all such modifications are intended to be included within their scope. Any benefits, advantages, or solutions to problems that are described herein with regard to specific embodiments are not to be construed as a critical, required, or essential feature or element of any or all the claims. Furthermore, it should be understood that the various operations described herein may be implemented in software, hardware, or a combination thereof. The order in which each operation of a given technique is performed may be changed, and the elements of the systems illustrated herein may be added, reordered, combined, omitted, modified, etc. It is intended that the embodiments described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as "connected" and/or "in communication with," although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
   receiving, on a first service provider network, a request for access to a target communication device, the target communication device being associated with a second service provider network;
   receiving an indicator, from the second service provider network, that the target communication device is roaming on a third service provider network; and
   establishing a peer-to-peer communication link with the target communication device on the third service provider network by a direct peer-to-peer interconnection process, by establishing a peer-to-peer communication session from a peering point in the first service provider network directly to a peering point in the third service provider network, that is associated with, and separate from, the target communication device.

2. The method of claim 1, wherein the direct peer-to-peer interconnection process comprises:
   referencing a list of available routes for peer-to-peer communication with the target communication device on the third service provider network;
   identifying a path for communication with the target communication device in response to the list of available routes; and
   establishing a peer-to-peer communication session with the target communication device over the path.

3. The method of claim 2, wherein identifying the path for communication with the target communication device comprises:
   obtaining default route information associated with a subscriber on a foreign service provider network in response to a request for route information, the default route information comprising identification of the peering point associated with the target communication device designated for peer-to-peer interconnection;
   generating a directed query for additional peer-to-peer interconnection routes in response to the default route information;
   obtaining one or more candidate routes from the foreign service provider network in response to the directed query; and
   selecting one of the candidate routes for establishing a peer-to-peer connection with the subscriber of the foreign service provider network.

4. The method of claim 1, wherein the peer-to-peer communication link is established directly between the first service provider network and the third service provider network.

5. The method of claim 1, wherein a first peer-to-peer communication link is established between the first service provider network and the second service provider network, and a second peer-to-peer communication link is established between the second service provider network and the third service provider network.

6. The method of claim 1, wherein a session control portion of the peer-to-peer communication link is established between the first service provider network and the second service provider network and a media path is established directly between the first service provider network and the third service provider network.

7. The method of claim 1, wherein the indicator that the target communication device is roaming on the third service provider network is generated in response to a query of an active subscriber database associated with the second service provider network.

8. A tangible computer-readable storage medium having program instructions stored thereon that, upon execution by a computer system, cause the computer system to:
   receive, on a first provider network, a request for access to a target communication device, the target communication device being associated with a second service provider network;
   receive an indicator, from the second service provider network, that the target communication device is roaming on a third service provider network; and
   establish a peer-to-peer communication link with the target communication device on the third service provider network with a direct peer-to-peer interconnection process, by establishing a peer-to-peer communication session from a peering point in the first service provider network directly to a peering point in the third service provider network, that is associated with, and separate from, the target communication device.

9. The computer-readable storage medium of claim 8, wherein the direct peer-to-peer interconnection process comprises:
   referencing a list of available routes for peer-to-peer communication with the target communication device on the third service provider network;
   identifying a path for communication with the target communication device in response to the list of available routes; and
   establishing a peer-to-peer communication session with the target communication device over the path.

10. The computer-readable storage medium of claim 9, wherein identifying the path for communication with the target communication device comprises:
    obtaining default route information associated with a subscriber on a foreign service provider network in response to a request for route information, the default route information comprising identification of the peering point associated with the target communication device designated for peer-to-peer interconnection;
    generating a directed query for additional peer-to-peer interconnection routes in response to the default route information;
    obtaining one or more candidate routes from the foreign service provider network in response to the directed query; and
    selecting one of the candidate routes for establishing a peer-to-peer connection with the subscriber of the foreign service provider network.

11. The computer-readable storage medium of claim 8, wherein the peer-to-peer communication link is established directly between the first service provider network and the third service provider network.

12. The computer-readable storage medium of claim 8, wherein a first peer-to-peer communication link is established between the first service provider network and the second service provider network, and a second peer-to-peer communication link is established between the second service provider network and the third service provider network.

13. The computer-readable storage medium of claim 8, wherein a session control portion of the peer-to-peer communication link is established between the first service provider network and the second service provider network and a media path is established directly between the first service provider network and the third service provider network.

14. The computer-readable storage medium of claim 8, wherein the indicator that the target communication device is roaming on the third service provider network is generated in response to a query of an active subscriber database associated with the second service provider network.

15. A system, comprising:
    a first service provider network configured to:
       receive a request for access to a target communication device, the target communication device being associated with a second service provider network;
       receive an indicator, from the second service provider network, that the target communication device is roaming on a third service provider network; and
       establish a peer-to-peer communication link with the target communication device on the third service provider network by a direct peer-to-peer interconnection process, by establishing a peer-to-peer communication session from a peering point in the first service provider network directly to a peering point in the third service provider network, that is associated with, and separate from, the target communication device.

16. The system of claim 15, wherein the direct peer-to-peer interconnection process comprises:
    referencing a list of available routes for peer-to-peer communication with the target communication device on the third service provider network;

identifying a path for communication with the target communication device in response to the list of available routes; and establishing a peer-to-peer communication session with the target communication device over the path.

17. The system of claim 16, wherein identifying the path for communication with the target communication device comprises:

obtaining default route information associated with a subscriber on a foreign service provider network in response to a request for route information, the default route information comprising identification of the peering point associated with the target communication device designated for peer-to-peer interconnection;

generating a directed query for additional peer-to-peer interconnection routes in response to the default route information;

obtaining one or more candidate routes from the foreign service provider network in response to the directed query; and selecting one of the candidate routes for establishing a peer-to-peer connection with the subscriber of the foreign service provider network.

18. The system of claim 15, wherein the peer-to-peer communication link is established directly between the first service provider network and the third service provider network.

19. The system of claim 15, wherein a first peer-to-peer communication link is established between the first service provider network and the second service provider network, and a second peer-to-peer communication link is established between the second service provider network and the third service provider network.

20. The system of claim 15, wherein a session control portion of the peer-to-peer communication link is established between the first service provider network and the second service provider network and a media path is established directly between the first service provider network and the third service provider network.

21. The system of claim 15, wherein the indicator that the target communication device is roaming on the third service provider network is generated in response to a query of an active subscriber database associated with the second service provider network.

* * * * *